PERCUSSION TOOL

Original Filed Sept. 19, 1960 2 Sheets-Sheet 1

INVENTORS
Samuel L. Collier
Melton L. Fly
BY Bertram H. Mann
ATTORNEY

PERCUSSION TOOL

Original Filed Sept. 19, 1960 2 Sheets-Sheet 2

INVENTORS
Samuel L. Collier
Melton L. Fly
BY Bertram H. Marx
ATTORNEY

United States Patent Office

Re. 26,038
Reissued June 14, 1966

26,038
PERCUSSION TOOL

Samuel L. Collier, Houston, Tex., and Melton L. Fly, Omaha, Nebr., assignors to Mission Manufacturing Company, a corporation of Texas Original No. 3,105,559, dated Oct. 1, 1963, Ser. No. 56,956, Sept. 19, 1960. Application for reissue Oct. 1, 1965, Ser. No. 492,345
15 Claims. (Cl. 173—15)

Matter enclosed in heavy brackets [ ] appears in the original patent but forms no part of this reissue specification; matter printed in italics indicates the additions made by reissue.

This invention relates to percussion tools for use in drilling holes in stone and other hard formations, as in quarrying and well drilling operations.

In order to obtain maximum efficiency in a percussion drill it is necessary to provide maximum pressure differential across the hammer piston during each stroke thereof. This is accomplished in present commercial structures by the provision of one or more valves which alternately direct the pressurized fluid to and exhaust the same from opposite ends of the casing. Such valves, frequently, are the cause of operational difficulties due to their failure to function properly.

Another difficulty with present percussion drills is that, while relatively small volumes of pressurized fluid are required for operating the tool, substantially larger volumes must be supplied for cleaning chips and debris from the hole. Furthermore, while the percussion motors may efficiently utilize relatively high pressures in increasing their drilling rates, such high pressures are not necessary for properly cleaning debris from the hole and would be wasteful if applied to scavenging fluid. Furthermore, present types of percussion drill motors are not equipped to fully and efficiently utilize relatively high fluid pressures.

Accordingly, an object of the present invention is to provide a substantially simplified, yet highly efficient percussion drilling tool.

Another object is to provide a percussion drill motor in which substantially the full differential between the pressure of the fluid supply and the ambient pressure in the hole is provided across the hammer piston during each stroke thereof, yet without the use of separate valves.

Another object is to provide a percussion drill motor adapted to efficiently utilize relatively high pressures.

Still another object is to provide a percussion drill motor in which a quantity of fluid is trapped and highly compressed in the rear casing chamber, in the range of reversal of the hammer movement, for dampening the shock and hastening the turn-around of the piston.

Still another object is to provide a novel percussion drill in which practically all of the porting and passages through the tool are provided in a central porting tube of relatively simple construction.

These objects and other more detailed objects hereafter appearing are attained by the device illustrated in the accompanying drawings in which.

Figure 1:
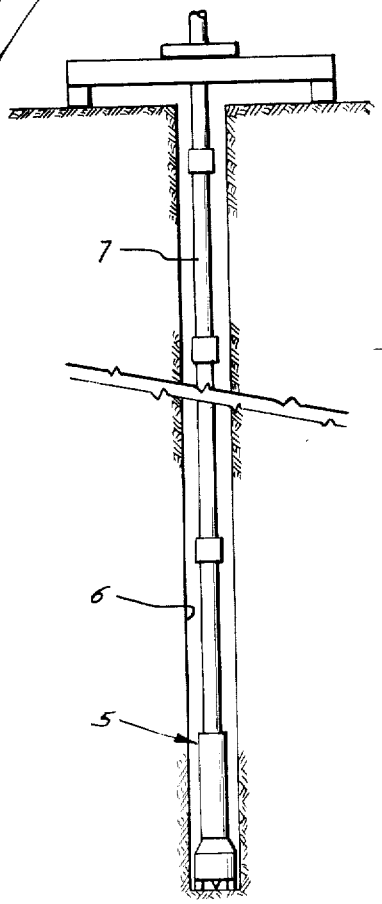
FIG. 1 is an elevation showing the tool introduced in a drilled hole.

The tool, generally designated 5, is shown supported in operative position in a drill hole 6 by means of a tubing string 7, as in quarrying or well drilling operations. The tool includes, broadly, a top sub 8 for attachment to the drill string or other support, a tubular body or casing 9 threadedly secured at 10 to the top sub, an anvil 11 slidably received in the bottom of body 9, a cylindrical, hollow hammer piston 12 which reciprocates within the casing to beat upon anvil 11, and a central porting tube 13 which forms, in effect, the inner walls of chambers formed by concentric cylinders. The body casing has an exhaust port 14 controlled by a part of piston 12, as will be described. A central duct 15 in the top sub snugly receives the cylindrical top portion 16 of tube 13 which has a top collar 17 supported in a countersink 18 in sub 8. A cylindrical lower portion 19 of tube 13 is slidably received in a countersink 20 formed in anvil 11 at the top of central aperture 21 therein. A bypass exhaust port **19*a* is provided in tube portion 19**. At the bottom of the anvil there is provided a cutting bit of any suitable type.

Extending axially through tube 13 from its upper end is a charging passage 22 which terminates in a transverse wall 23 located intermediately of tube 13 and within the cylindrical intermediate portion 24 thereof. A second axial duct 25 extends from transverse wall 23 through the bottom of tube 13 where it discharges into exhaust passage 21 in the anvil. A bypass port 26 is provided in dividing wall 23. Upper passage 22 in the porting tube communicates at its upper end with the hollow interior 27 of the upper sub for connecting the tool with a source of pressured fluid suitably connected to the sub. A main charging port 28 opens laterally through intermediate portion 24 of the tube and connects charging passage 22 to the exterior of the tube. An exhaust port 29 opens laterally through the lower part of tube 13 and connects exhaust passage 25 therein to the exterior of the tube.

Figure 4:
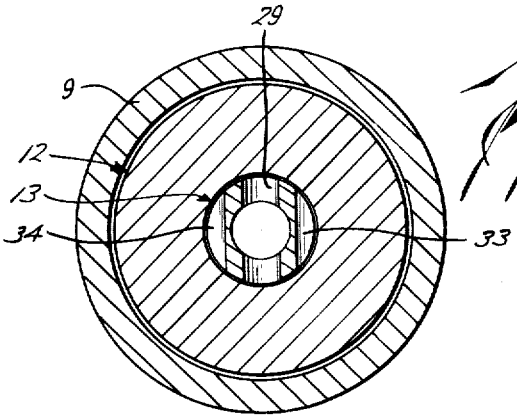
FIG. 4 is transverse section taken on line 4—4 of FIG. 3.

The upper part of the porting tube, between upper and intermediate cylindrical portions 16 and 24 thereof, is oppositely flattened, to form diametrically opposite, segmental recesses 31 and 32. The lower part of tube 13, between cylindrical intermediate and lower portions 24 and 19 is also oppositely flattened, as shown in FIG. 4, to provide diametrically opposite segmental recesses 33 and 34. Between recesses 33 and 34 and cylindrical portion 24 there is provided a reduced cylindrical portion 35 forming an annular valving shoulder 36 at the lower edge of portion 24 of the tube. At the upper edge of tube portions 24 is a second valving shoulder 37.

The hollow cylindrical hammer piston 12 has an axial orifice 40 which is slidably received upon the porting tube. The cylindrical exterior of the hammer piston is provided with separated end portions 41 and 42 slidably received within the cylindrical interior of body casing 9 and provided with oil collecting grooves 43 and 44. In the longitudinal center of internal bore 40 in the hammer piston there is provided an annular shuttle groove 45 which communicates with main charging port 28 and alternately connects this port with the opposite ends of the body casing, as will be described. The end walls of the hammer piston are identical and each is provided with an annular portion 46 at 90 degrees to the axis of the tool and an inner portion 47 making a slight angle to portion 46. The bottom end of the hammer piston engages the top portion 48 of the anvil having radial ribs 49 which prevent snug contact between the striking ends of the piston and anvil. The anvil is interiorly relieved, as at 50, for guiding the bottom end 19 of porting tube 13 into the anvil in assembly and for increasing the volume of the bottom pressure chamber in the casing, as will be described. The upper part of the anvil is exteriorly relieved as at 51 and the ends of the piston are exteriorly relieved as at 52 and 53, also for increasing the volume of the pressure chambers at the ends of the casing.

At the opposite ends of shuttle groove 45 are annular valving shoulders 55 and 56. The inner extremity of externally relieved portion 53 at the upper end of the hammer piston forms an annular valving shoulder 57, while the inner corner 58 at the bottom of the hammer piston also forms a valving shoulder.

Anvil 11, intermediately, is provided with flutes or splineways 60 which receive roller bearings 61 held in position by a split driver sub 62 for enforcing rotation of the anvil with the casing and drill string secured thereto. Sub 62 is threadedly secured at 63 to the lower extremity of body casing 9. Splineways 64 are formed in the intermediate portion of the driver sub in which roller bearings 61 are received. Opposing shoulders or ledges 65 and 66 and 67 and 68 respectively on the anvil and driver sub limit the relative sliding movements of the anvil and sub 62 attached to the casing body.

In operation, top sub 8 is connected to a suitable support and source of compressed air or other pressured fluid, such as drill string 7, and the tool is lowered against the formation to be drilled or into the hole. While the tube is suspended, anvil 11 will drop down with its shoulder 65 resting on ledge 66 at the top of driver sub 62. This will shift the top of the anvil to the dotted line position 48a (FIG. 3) and cause the exposure of exhaust port 19a at the bottom of the porting tube to the relieved inner portion 50 at the top of the anvil. If, at the same time, the pressured fluid is being supplied through the top of the porting tube, this fluid will continuously escape through main charging port 28, shuttle groove 45, segmental recesses 33 and 34, and passage 21 to the bottom of the tool. This continuous bypassing of the pressured fluid supply serves to prevent tapping of the hammer piston while the tool is suspended and also serves to discharge the maximum volume of pressured air through the bottom of the tool, as for cleaning out the hole.

Figure 3:
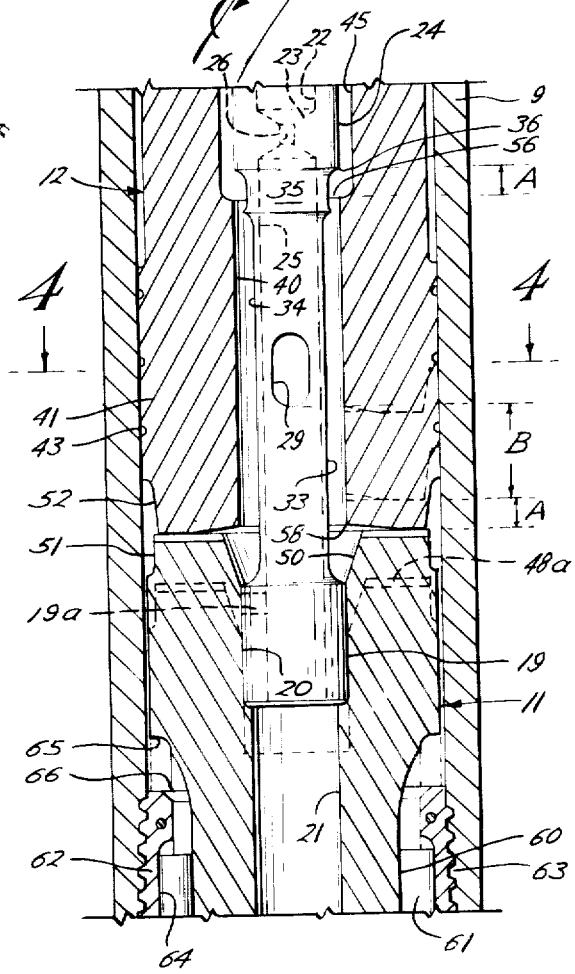
FIG. 3 is a view similar to FIG. 2B but showing the piston engaging the anvil.
Figure 2A:
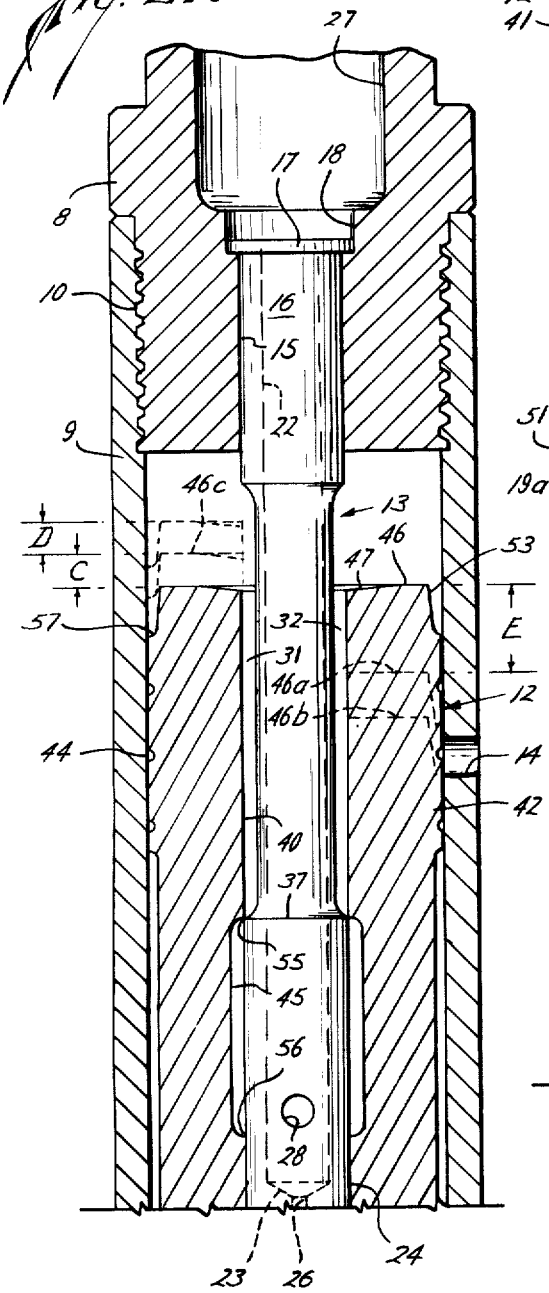
FIG. 2A is an enlarged central longitudinal section showing the upper part of the tool, including dotted line representations of different operative positions of the hammer piston.
Figure 2B:
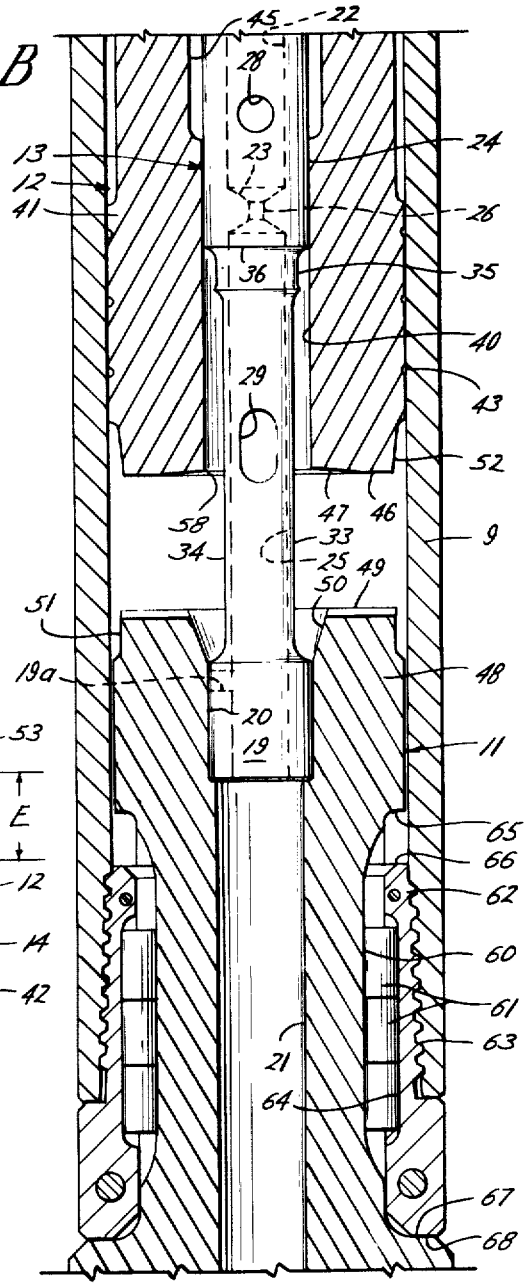
FIG. 2B is a view similar to FIG. 2A, but showing the lower part of the tool.

When the bit is resting on the bottom, with the weight of the tool lowered, ledge 68 on the bottom of the driver sub will rest against shoulder 67 on the anvil so that the full weight of the tool will bear against the bit. The hammer piston, normally, rests in its lower position assumed as the hammer piston strikes the anvil (FIG. 3). At the same time, annular valving shoulder 56 on the piston will clear shoulder 36 on the porting tube by the distance A. If now the pressured fluid supply is turned on the fluid passes downwardly through charging passage 22 in tube 13, main charging port 28, shuttle groove 45, clearance A and segmental recesses 33 and 34 to fill the spaces 50, 51 and 52 at the lower end of the casing. Since, at the same time, annular shoulder 57 at the top of the piston will have cleared exhaust port 14 in the body casing, as indicated by broken lines 46b in FIG. 2A, so that the chamber at the top of the casing will be at ambient pressure, piston 12 will rise rapidly. When the piston has risen the distance A to eliminate clearance at this point, the supply of pressured fluid will be cut off from the lower part of the casing and, thereafter, the fluid in spaces 50, 51 and 52 will expand, driving the piston farther upwardly through the distanc B. At this point, valving edges 58 at the bottom of the piston passage 40 will begin to uncover exhaust port 29 for exhausting bottom casing spaces 50, 51 and 52. Upward travel of the piston will continue a short additional distance due to inertia.

During the upward movement of the piston, external annular shoulder 57 at the top of the piston will shortly pass beyond and close exhaust port 14. Thereafter, preferably after the bottom casing chamber has begun to exhaust, internal annular valving shoulder 55 at the upper edge of shuttle groove 45 will clear annular shoulder 37 on the porting tube for conducting pressured fluid from main port 28 through the shuttle groove and segmental recesses 31 and 32 in tube 13 to the upper end of the casing body. During a portion C of the upward travel of the piston equal to the longitudinal dimension of main charging port 28, and after exhaust port 14 is closed, as represented by broken line 46c in FIG. 2A, the upper end of the casing will be charged. Preferably, the volume of the chamber at the upper end of the casing at this time will be designed to permit bringing this space substantially to line pressure during the mentioned charging period.

Following upward travel of the piston through range C annular shoulder 56 at the lower edge of shuttle groove 45 will pass beyond and close charging port 28 so that the upper end of the casing will then be sealed both from the charging and exhaust ports. Thereafter, during a relatively short period D the upward travel of the piston will be halted and reversed. Also during this portion of the piston travel, the gaseous fluid in the top of the casing will be compressed to dampen and expedite the turn-around or reversal of piston movement. This cushioning or bounce chamber effect materially increases the cycling speed of the hammer piston.

After the hammer piston has retraversed the distance D, charging port 28 will be again exposed to shuttle groove 45 for supplying another pressure shot to the top of the casing during the portion C of piston travel. During the next portion E of downward piston travel, the pressured gas in the top of the casing will expand until shoulder 57 on the piston begins to recross and clear exhaust port 14. Thereupon, the upper casing chamber is exhausted and pressured fluid is supplied to the bottom casing chamber to repeat the cycle.

The sizes of the chambers at the ends of the casing body during the charging, expansion, and turn-around periods are very important. As previously suggested, these chambers should be small enough to permit charging thereof to substantially the full line pressure during the times when valving shoulders 37 and 55 and 36 and 56 are cleared. It is equally important that these chambers be large enough so that pressures therein do not drop excessively during the expansion ranges B and E. Since the pressure at the end of the expansion period is related to the initial pressure in inverse ratio as the longitudinal dimensions of the chambers vary, it is important that this latter ratio be as small as practicable. Thus the clearances 50, 51, 52, and 53, in effect, beyond the regions traversed by the piston contribute materially to the holding up of the fully expanded pressure. Yet, the provision of expansion ranges during both strokes of the piston results in more efficient use of the line pressure.

The hole 26 provided in dividing wall 23 in the porting tube provides a continuous bypass of pressured fluid through the tool, as is sometimes desirable for more effective removal of chips. This bypass may be provided by a separate conduit extending entirely through the porting tube and, if desired, separately pressured supplies may be furnished to the bypass and percussion motor, as illustrated in co-pending application Serial No. 61,236, filed October 7, 1960, in the name of Samuel L. Collier. The novel percussion tool according to the present invention will efficiently utilize compressed operating fluids at very much greater pressures, but in substantially less volumes than are desirable for performing the chip and debris lifting function. Moreover, the tool is substantially more efficient yet simpler than other tools now on the market due to the provision of the maximum pressure differential across the piston, during the piston stroke while omitting separate valves, and also due to the expansion periods during both the striking and return strokes of the piston which permits the exhausting of air from the percussion motor at a relatively low pressure.

The invention may be modified in various respects as will occur to those skilled in the art and the exclusive use of all modifications as come within the scope of the appended claims is contemplated.

We claim:

[1. In a percussion drilling tool, a casing, an anvil element at the forward end of said casing and a connection for a pressured fluid supply at the rearward end thereof, a hammer piston reciprocable in said casing for beating upon said anvil element, and fluid inlet and exhaust ports in the wall of said casing traversed by said piston for alernately admitting pressured fluid to and exhausting the same from said ends, said ports being positioned to be selectively covered and uncovered by said piston to admit pressured fluid to said forward casing end and exhaust said rearward casing end during the last part of the forward stroke of said piston and the initial part of the succeeding return stroke, to cut off the exhaust from said rearward casing end and to admit pressured fluid thereto, intermediately during the rearward stroke of said piston, and to cut off the pressured fluid supply to said rearward end during the last part of said rearward stroke and the initial part of the succeeding forward stroke whereby the charge of pressured fluid in said rearward end is compressed and expanded to cushion and expedite the turn-around of said piston.]

2. In a percussion drilling tool, a hollow casing, an anvil element at the forward end of said casing and a duct for a pressured fluid supply at the rearward end thereof, a hammer piston reciprocable in said casing for beating upon said element, said casing and piston having slidably engaging wall structure, fluid inlet and exhaust porting in said casing wall structure, and longitudinal recesses in said wall structure for alternately connecting the ends of said casing with said porting, said porting and recesses and said wall structure being constructed and arranged to cooperate to admit pressured fluid to said forward casing end and exhaust said rearward casing end during the last part of the forward stroke of said piston and the first part of the succeeding return stroke, to cut off the exhaust from and admit pressured fluid to said rearward casing end intermediately during the rearward stroke of said piston, and to cut off the admission of pressured fluid to said rearward end during the last part of said rearward stroke and the first part of the succeeding forward stroke whereby the fluid charge in said second casing end is compressed and expanded to cushion and expedite the turn-around of said piston.

3. In a percussion drilling tool, a hollow casing, an anvil element mounted at and forming the forward end of said casing and a connection at the rearward end of said casing for a pressured fluid supply, a fluid discharge duct in said anvil, a tubular member extending through said casing from said connection to said duct, and a hammer piston member reciprocable in said casing about said tubular member for beating against said anvil element, said piston and tubular members having slidably engaging wall structure, one of said members having an inlet port and the other member having a recess forming valving means for alternately directing pressured fluid from said inlet port to the opposite ends of said casing, one of said members having an exhaust port and the other member being shaped to selectively occlude said exhaust port and to clear the same for exhausting one end of said casing.

4. A percussion drilling tool as described in claim 3 further including recessed structure in the wall of the chamber formed by said casing and the end of said piston for increasing the volume of said chamber without varying the overall dimensions of said casing or the overall dimensions or stroke of said piston member.

5. A percussion drilling tool as described in claim 3 further including a recess in said piston member extending inwardly from one end thereof for effectively increasing the space in said casing for receiving pressured fluid.

6. A percussion drilling tool as described in claim 3 in which said anvil element is slidably received in the forward end of said casing and upon the end of said tubular member, there being a bypass exhaust port in the end of said tubular member positioned to be obturated by the anvil wall during normal operation of the tool with the weight of said casing resting on said anvil and to be cleared by said anvil when said casing is lifted from said anvil.

7. A percussion tool as described in claim 3 in which said valving means is incorporated in said engaging wall structure and includes a portion for intermittently occluding said inlet port and positioned to expose said inlet port to the pressured fluid connection end of said casing during a portion only of the stroke of said piston toward said end and to cut off said inlet port from said casing during the remainder of said stroke and at least the first part of the forward stroke of said piston.

8. In a percussion drilling tool, a hollow casing having an anvil element mounted at its forward end and a connection for pressured fluid at its rear end, a discharge duct in said anvil element, a hollow, tubular member extending axially through said casing, inlet and discharge ports in the side wall of said tubular member, passageways in said member, respectively, connecting said ports to said connection and said discharge duct, a hammer piston slidable in said casing and about said tubular member, a recess in the inner wall of said piston reciprocable along said inlet port and positioned to alternately connect said inlet port to the opposite ends of said casing during the movements of said piston toward said ends, a forward part of said piston inner wall being slidable along and occluding said exhaust port during the major portion of the rearward stroke of said piston and clearing at least a part of said exhaust port substantially at the end of said rearward stroke to exhaust said casing forward end preparatory to turn around and forward movement of said piston, and means to exhaust said casing rear end substantially at the end of the piston forward stroke.

9. A percussion tool as described in claim 8 in which said internal passageways in said tubular member are arranged end to end with separating structure therebetween.

10. A percussion drilling tool as described in claim 8 in which said recess in said piston inner wall and the adjacent wall are positioned to interconnect said inlet port and said casing rear end only during a portion of the rearward stroke of said piston substantially before the end of said rearward stroke and to occlude said inlet port from said casing rear end during the last part of said rearward stroke whereby the trapped fluid in said rear end alternately is compressed and expanded to cushion and expedite the turn-around of said piston, said recess and adjacent piston wall also being positioned to interconnect said inlet port and the casing forward end only substantially at the end of the forward stroke and a limited portion of the ensuing rearward stroke of the piston.

11. In a percussion drilling tool, a hollow casing having an anvil element at its forward end and a connection for pressured fluid at its rearward end, a discharge duct in said element, a tubular member extending axially through said casing from said connection to said anvil element, longitudinally spaced inlet and discharge ports in the side wall of said tubular member intermediately of the ends thereof, passageways in said member, respectively connecting said inlet and discharge ports to said connection and said duct, a hammer piston slidable in said casing and on said tubular member, a recess in the inner wall of said piston slidable along said inlet port, recesses in the end portions of the outer wall of said tubular member positioned to be overlapped by said first recess for alternately connecting opposite ends of said casing to the pressure fluid supply, and means to alternately exhaust the forward end of said casing.

12. A precussion tool as described in claim 11 in which one of the recesses in the rearward part of said tubular member is overlapped by the rearward end of the recess in the piston inner wall intermediately of the rearward stroke of said piston for admitting a charge of pressured fluid to the rearward end of said casing and the forward end of said piston recess and the adjacent piston wall are positioned to occlude said inlet port shortly thereafter and before the end of said rearward stroke whereby the charge to said rearward casing end is restricted and the successive compression and expansion of the trapped fluid cushion and expedite the turn-around of said piston.

13. A percussion tool as described in claim 11 in which said discharge port is positioned to be avoided by said piston wall recess and to be cleared by the forward edge of said piston, substantially at the end of said rearward stroke, for exhausting said forward casing end.

14. A percussion tool as described in claim 11 in which an exhaust port is provided in the wall of said casing in position to be cleared by the rear edge of said piston substantially at the end of the forward piston stroke for exhausting the rearward casing end.

*15. A percussion unit for a percussion drill comprising an elongated tubular casing adapted for removable attachment to the lower end of a string of drill pipe, anvil and drill bit means slidably mounted in the lower end of said casing and adapted to rotate with said casing and having a central passage therethrough, piston type hammer means having an upper end and a lower end and slidably mounted in the central portion of said casing and adapted to strike said anvil and bit means during the power stroke of said hammer means, power fluid exhaust tube means having an upper end and a lower end and passing through said hammer means and into said passage of said anvil and bit means forming a substantially fluid tight seal therebetween at least during the normal power and return strokes of said hammer means and adapted to provide communication between said drill pipe and said passage through said anvil and bit means, valve means adapted to alternately supply power fluid from said drill pipe to the ends of said hammer means during said power stroke and return stroke of said hammer means respectively, exhaust means, including first port means in said exhaust tube means, adapted to alternately discharge power fluid from said casing adjacent the ends of said hammer means, at least in part through said exhaust tube means and during at least a portion of said power stroke and said return stroke of said hammer means respectively, second port means located above the lower end of said exhaust tube and adapted to be closed by the anvil and bit means during normal operation of the hammer means and to be opened when said anvil and bit means falls below the normal operating position thereof, and a power fluid escape passage formed between the lower end of said hammer means and said anvil and bit means, said escape passage connecting the return stroke side of said valve means with said second port means so that power fluid is discharged from the return stroke side of said valve means to said passage in said anvil and bit means whenever said hammer means overtravels the normal operating stroke of said hammer means.*

*16. A percussion unit for a percussion drill comprising an elongated tubular casing adapted for removable attachment to the lower end of a string of drill pipe, anvil and drill bit means slidably mounted in the lower end of said casing and adapted to rotate with said casing and having a central passage therethrough, piston type hammer means having an upper end and a lower end and slidably mounted in the central portion of said casing and adapted to strike said anvil and bit means during the power stroke of said hammer means, power fluid exhaust tube means having an upper end and a lower end and passing through said hammer means and into said passage of said anvil and bit means forming a substantially fluid tight seal therebetween at least during the normal power and return strokes of said hammer means and adapted to provide communication between said drill pipe and said passage through said anvil and bit means, valve means adapted to alternately supply power fluid from said drill pipe to the ends of said hammer means during said power stroke and return stroke of said hammer means respectively, exhaust means adapted to alternately discharge power fluid from said casing adjacent the ends of said hammer means including first port means in said exhaust tube means for exhausting said casing adjacent at least one end of said hammer means through said tube means, second port means located above the lower end of said exhaust tube and adapted to be closed by the anvil and bit means during normal operation of the hammer means and to be opened when said anvil and bit means falls below the normal operating position thereof, and a power fluid escape passage formed between the lower end of said hammer means and said anvil and bit means, said escape passage connecting the return stroke side of said valve means with said second port means so that power fluid is discharged from the return stroke side of said valve means to said passage in said anvil and bit means whenever said hammer means overtravels the normal operating stroke of said hammer means.*

References Cited by the Examiner

The following references, cited by the Examiners, are of record in the patented file of this patent or the original patent.

UNITED STATES PATENTS

| | | |
|---|---|---|
| 727,954 | 5/1903 | Iler. |
| 803,877 | 11/1905 | Champ. |
| 1,293,961 | 2/1919 | Smith. |
| 1,518,124 | 12/1924 | Mercer. |
| 1,712,436 | 5/1929 | Jimerson. |
| 1,861,042 | 5/1932 | Zublin. |
| 2,563,083 | 8/1951 | Topanelian. |
| 2,859,733 | 11/1958 | Bassinger et al. |
| 2,861,548 | 11/1958 | Burgess et al. |
| 2,887,989 | 5/1959 | Dulaney. |
| 2,917,025 | 12/1959 | Dulaney. |
| 2,947,519 | 8/1960 | Feucht. |

FRED C. MATTERN, Jr., *Primary Examiner.*

BROUGHTON G. DURHAM, MILTON KAUFMAN, *Examiners.*

L. P. KESSLER, *Assistant Examiner.*